(12) United States Patent
Julve Sebastian et al.

(10) Patent No.: US 9,006,308 B2
(45) Date of Patent: Apr. 14, 2015

(54) REINFORCING FILLER FOR RUBBER

(75) Inventors: Daniel Javier Julve Sebastian, Saragossa (ES); Maria Martinez Falcon, Saragossa (ES); Jose Ramos Escribano, Saragossa (ES); Jorge Perez Cacho, Saragossa (ES); Miguel Menedez Sastre, Saragossa (ES); Joaquin Coronas Ceresuela, Saragossa (ES); Ma Pilar Bernal Paredes, Saragossa (ES)

(73) Assignee: Industrias Quimicas del Ebro, S.A., Saragossa (ES)

( * ) Notice: Subject to any disclaimer, the term of this patent is extended or adjusted under 35 U.S.C. 154(b) by 0 days.

(21) Appl. No.: 14/344,780

(22) PCT Filed: Dec. 5, 2011

(86) PCT No.: PCT/EP2011/006343
§ 371 (c)(1),
(2), (4) Date: Mar. 13, 2014

(87) PCT Pub. No.: WO2013/053375
PCT Pub. Date: Apr. 18, 2013

(65) Prior Publication Data
US 2014/0371348 A1 Dec. 18, 2014

(30) Foreign Application Priority Data
Oct. 11, 2011 (ES) .................................. 201131634

(51) Int. Cl.
*C08J 9/32* (2006.01)
*C08K 7/26* (2006.01)
*C08K 3/00* (2006.01)
*C08K 3/34* (2006.01)
*C08L 9/06* (2006.01)

(52) U.S. Cl.
CPC ................ *C08K 7/26* (2013.01); *C08K 3/0033* (2013.01); *C08K 3/34* (2013.01); *C08L 9/06* (2013.01)

(58) Field of Classification Search
USPC ............................ 106/491; 523/218; 524/492
See application file for complete search history.

(56) References Cited

FOREIGN PATENT DOCUMENTS

| EP | 1321489 | 6/2003 |
| EP | 1518895 | 3/2005 |

OTHER PUBLICATIONS

International Search Report PCT/EP2011/006343.

*Primary Examiner* — Edward Cain
(74) *Attorney, Agent, or Firm* — Lucas & Mercanti, LLP

(57) ABSTRACT

The present invention describes a reinforcing filler for rubber comprising the synergistic combination of precipitated silica with a pore structure defined by a maximum between 25 nm and 35 nm, a total pore volume between 1.3 cm$^3$/g and 1.6 cm$^3$/g, and a compression factor between 1.3 $10^{-2}$ and 2.3 $10^{-2}$ MPa$^{-1}$, and at least one crystalline alkaline silicate corresponding to the general formula of the crystalline alkaline silicates, said crystalline alkaline silicate being swelled and/or layered in the presence of an organic cationic compound in the form of ammonium salt of the +NR$_4$ type according to the formula $[C_nH_{2n+1}N(CH_3)_3]^+$. The rubber formulation obtained by this reinforcing filler composition does present a great reduction of energy dissipated in the tread without compromising the abrasion resistance and elastic modulus properties.

12 Claims, No Drawings

_US 9,006,308 B2_

REINFORCING FILLER FOR RUBBER

CROSS REFERENCE TO RELATED APPLICATION

This application is a 371 of PCT/EP2011/006343 filed Dec. 5, 2011, which in turn claims the priority of ES P201131634 filed Oct. 11, 2011, the priority of these applications is hereby claimed and these applications are incorporated by reference herein.

TECHNICAL FIELD

The present invention describes a reinforcing filler for rubber applicable in the rubber industry, and particularly for tire tread bands in the automotive sector.

STATE OF THE ART

The production of rubber which, by the addition of inorganic fillers or reinforcing compounds such as the carbon black or precipitated silica successfully increases the mechanical resistance of the rubber, is well known for the person skilled in the art. Particularly, for rubber which is used in the tire tread bands, the addition of precipitated silica as a reinforcing compound successfully reduces the energy loss during rolling and, therefore, generates a lower fuel consumption in the vehicles.

In this context, systems based on "high dispersion silicas/organosilanes" have been considered, especially in Europe, the preferred filler system for the passenger car tire tread band. A summary about these systems, known as "green tires", was presented by J. T. Byers in an article compiled in the journal Rubber Chem. Technol. Vol. 75 (3), 527-547 (2002).

The mixtures of rubber for "green tires" provide, with respect to other previous formulations based on traditional carbon black filler systems, an improved compromise between grip, rolling resistance and wear resistance: the so-called "magic triangle" of tire properties. There are five basic points for improving the properties: a) using precipitated silica as base of the filler system, b) that the silica used is of the "highly dispersible" type, c) a coupling agent of the organosilane type, d) a polymer mixture based on solution SBR and BR, and e) a vulcanization system adjusted to the rest of the components.

Thus, Degussa's patent EP 0901986 B1 relates to a precipitated silica and to the process of obtaining it. It describes, among other features, the preparation of said precipitated silica for obtaining a product having specific surface between 120 and 300 m$^2$/g. This specific surface can comprise a wide variety of pore size; however, the compression factor or compressibility thereof is not detailed. The types of silica comprised in the scope of this patent are defined by the characteristics described which are different from the silica of the invention. The possible similarity between the two silicas will be determined by the resemblance in their method of preparation. The publication comprises the possible addition of other components such as organosilanes or carbon black to the rubber, but examples showing the preferred combination with these reinforcing agents or with any other additive are not provided, neither does it demonstrates the synergistic interaction between them. No crystalline alkaline silicate which can interact with said silica is mentioned and therefore the patent does not anticipate the subject matter of the present invention and does not affect its patentability.

Rhodia's patent EP 0520862 B1 describes a silica composition for reinforcing elastomers. The silica described is defined by several characteristics comprising a BET area between 140 and 200 m$^2$/g, a CTAB area between 140 and 200 m$^2$/g, a DOP value between 180 and 350 ml/100 g and a factor V2N1>50%. The silica of the present invention has a pore structure defined by a maximum between 25 nm and 35 nm, but it further has the differentiating features of a compression factor of 1.3 10$^{-2}$ to 2.3 10$^{-2}$ MPa$^{-1}$ involving a particular embodiment of this reference. Furthermore, the subject matter of the invention is broader than the silica considered in the isolated manner. The invention goes beyond the teachings of the reference publication by referring to the synergistic combination of silica and a crystalline alkaline silicate as reinforcing filler for rubber. There is not an element in this publication which anticipates or suggests the combination of the invention, nor does it described any synergistic effect with other components not even the ones standard for reinforcing rubber.

Rhodia's patent EP 0670813 B1 describes a silica composition for reinforcing elastomers. The silica described is defined by several characteristics comprising a CTAB area between 140 and 240 m$^2$/g, with factors V2/V1<50%, FD>5.5 ml and d$_{50}$<5 μm, after ultrasounds. The examples refer to the method of obtaining the silica and its comparison with other commercial silicas, granule preparation, application to the rubber and properties of the resulting rubber mixture. The silica of the present invention has a pore structure defined by a maximum between 25 nm and 35 nm, but it is differentiated by a compression factor of 1.3 10$^{-2}$ to 2.23 10$^{-2}$ MPa$^{-1}$ excluding it from the scope of the reference patent. Furthermore the invention goes beyond the teachings of the publication since the latter does not describe the synergistic combination of the silica with a crystalline alkaline silicate as reinforcing filler for rubber.

Similarly, Michelin's patent FR 0501227 B1 describes a rubber composition comprising silica as reinforcing agent although it can also comprise other components standard in the art such as carbon black or any other compound in a small amount. The patent uses the silica obtained according to the European patent EP-A-157 703 but states that the characteristics of the rubber obtained are maintained with any silica available in the art. The protection deals with method of manufacturing rubber which determines the properties of the end product, comprising the incorporation of a standard silica. The only object of this patent in common with the present invention is that both use silica. However, in the reference patent said silica does not form part of the subject matter of the invention and is defined in the most general manner possible. This should not affect the patentability of the synergistic combination of the invention involving silica but of several particular characteristics.

In the art there are also numerous inventions which incorporate clay platelets in polymer and rubber systems, but none of them describe the synergistic combination of a particular silica with the crystalline alkaline silicates proposed in the invention.

In this sense, Continental's patent ES 2301587 T3 describes a vulcanizable rubber mixture comprising diene rubber and a stratified swelled silicate in addition to other additives. The stratified silicate must be modified with alkyl-ammonium ions of formula NR$_4^+$ with a hydroxyl group at the end of the chain, which completely determines its structure and activity and differentiates it from the current invention. Furthermore, although the patent uses the Degussa's commercial silica VN3, the generality of its wording does not anticipate the particularity of the silica of the present invention and should not therefore affect its novelty in terms of patentability. Furthermore, the reference patent does not suggest any synergistic effect of the silica with the stratified silicate. The person skilled in the art would not find the suggested use of the silica used in the invention or of any other to achieve the synergistic effect described. Therefore, the possible combination of components of the reference patent should not affect the inventive step of the combination of the invention.

Goodyear's application EP 1518895 A1 discloses an elastomer composition for tire including a swelled layered silicate previously added in the rubber, but it is, however, chemically different from the silicate of the present invention. Furthermore it does not describe or suggest any synergistic effect between the components nor does it evaluate the effect of varying the type of reinforcing filler.

Application EP 1685980 A1, also belonging to Goodyear, describes the composition of the internal layer of a tire tread band made up of textile and rubber including a swelled clay. The publication, however, does not specify the advantages provided by this compound which does not resemble the compounds of the present invention in any manner.

Toyota's application EP 1029823 A2 describes a rubber reinforced with clays expanded by intercalation with organic onium ions and polar guest molecules, in which said onium ions are bound with said guest molecules and with the rubber material. The polar guest molecule would be the one responsible of interspacing the expanded clay. However, it does not describe the addition of silica to the rubber and it therefore does not describe any synergistic capacity by the combination of these compound, thus being differentiated from the present invention.

Pirelli's international application WO 2005/042278 describes a rubber mixture formed by at least four components: a diene elastomer, a clay, mica or talc type layered silicate treated with a quaternary ammonium salt $NR_4^+$ of alkyl chains having between 1 and 20 carbon atoms, a methylene donor compound and finally a methylene acceptor compound. The application proposes that the "in-situ" polymerization reaction between the methylene donor and the acceptor allows improving the properties of the rubber mixtures based on layered silicates, properties which without the presence of a methylene donor and acceptor would present various drawbacks complicating the applicability thereof in the tire parts which require high amounts of inorganic filler. To achieve the properties of interest, they suggest a synergistic effect between layered silicate and the reaction generated between a methylene donor and acceptor. The possible presence of other fillers is included: carbon black, silanes, silica, etc. Although the silica and layered silicate combination appears, in Pirelli's publication the presence of a methylene donor and acceptor is necessary which differentiates it from the present invention. Furthermore at no time does it mention the synergistic effect between silica and layered silicate, or the use of the synthetic crystalline layered silicates used in the present invention nor does it list the use of a quaternary ammonium salt with bromide ion as swelling agent.

Goodyear's application EP 1321489 A1 claims a nanocomposite formed by a polymeric elastomer and clay platelets, achieved by polymerizing the precursors of the polymer inside the layers of the clay. This composite can be used in tire tread band mixtures. Although one of the raw materials is similar, the processes, materials and improvements provided are different from those of the present invention.

Exxonmobil's publication US 2007/238822 A1 discloses a composite comprising a swelled or non-swelled clay, two types of elastomers and that it can include calcium carbonate, carbon black, plasticizers and silica. This application studied the characteristics of the product resulting from the combination of silicates treated with different exfoliating agents with two elastomers of different molecular weight. The product would not be used in the tread band but in other parts of the tire, such as the innerliner or innertube the requirements of which are completely different, seeking air impermeability. It does not specify any type of preferred silica and it does not describe the synergistic effect between said silica and the exfoliated layered silicate, and it therefore should not affect the patentability of the synergistic combination of the invention.

Continental's application US 2002/095008 A1 which is considered the publication closest to the present invention, discloses a composition for tire tread bands comprising a diene rubber and a layered silicates filler modified with quaternary alkylammonium salts. In addition to the layered silicate and the carbon black which are expressly mentioned in the claims, the incorporation of silica is mentioned among the additional fillers which can be added. However, at no time does it mention nor suggest a synergistic effect between the silica and the layered silicate. It also does not anticipate the improvement achieved in the properties of the rubber mixture described in this patent when the individual silica and the silicates described herein are used, particularly the reduction of fuel consumption.

Ultimately, the problem posed by the technique is to obtain a reinforcing filler for rubber which improves the energy dissipation parameters in tread with respect to the current ones, but is also capable of maintaining the loss by abrasion and elastic modulus within acceptable values for the final application. The solution provided by the present invention is the synergistic combination of a particular low deformability and high reinforcement silica with a crystalline layered silicate swelled with a quaternary ammonium salt, providing such characteristics.

DESCRIPTION OF THE INVENTION

The present invention describes a formulation for rubber the main novelty of which lies in the composition of the reinforcing filler.

Thus, the invention is a reinforcing filler for rubber comprising the synergistic combination of precipitated silica with a pore structure defined by a maximum between 25 nm and 35 nm, a total pore volume between 1.3 cm³/g and 1.6 cm³/g, and a compression factor between $1.3 \cdot 10^{-2}$ and $2.3 \cdot 10^{-2}$ MPa$^{-1}$, and at least one crystalline alkaline silicate corresponding to the general formula

$$M_2O.xSiO_2.yH_2O$$

wherein
M is H, Na or K,
"x" is an integer between 2 and 40, and
"y" is an integer between 1 and 20,
said crystalline alkaline silicate being swelled and/or layered in the presence of an organic cationic compound in the form of ammonium salt of the +NR$_4$ type according to the formula $[C_nH_{2n+1}N(CH_3)_3]^+$ for n equal to 12, 14, 16 or 18. Said ammonium salt is preferably chloride or bromide.

In the scope of the present invention, the term "synergistic combination" or synergy is understood as the increased effect of the properties observed in the rubbers obtained according to the invention with respect to the effect which would be obtained with the summation of each of the components separately with respect to processability, reinforcement, loss of energy by hysteresis or loss factor, grip, abrasion and dynamic modules at low deformation. Both swelled and non-swelled layered silicate is a filler having low reinforcing effect, whereas the effect of the silica is well known within the art. The combination thereof, however, has very different effects even with the addition of very small amounts of layered silicate.

In a preferred embodiment of the invention said crystalline alkaline silicate is present in a concentration between 0.1 and 30 phr (parts per hundred parts of rubber by weight), more preferably between 0.1 and 15 phr, and yet more preferably between 0.1 and 6 phr.

The layered silicate corresponds to the general formula of the crystalline alkaline silicates called "synthetic layered silicate hydrates". The swelling thereof is produced by complete or partial ionic exchange of the cations present with a quaternary ammonium salt.

In the art the layered silicates most widely used as fillers in polymers are natural clays formed by layers of alumino-silicates and magnesium-silicates with basal spacings between 0.7 and 1.2 nm and with negative charges on their surface, such as for example the montmorillonite, saponite, hectorite, etc. In the present invention the family of crystalline alkaline silicates is preferably synthetic materials which allow a better control of the structure and properties of the material, which leads to a better reproducibility in the properties. The $xSiO_2$ part therein is formed by tetrahedrons ($SiO_4$) bound to one another by three or four of their vertices, such that they give rise to a two-dimensional layer structure of firmly bound atoms, whereas $yH_2O$ relates to the structural hydroxyl groups and to the water molecules located between layers. The solvated exchangeable metal cations $M_2O$, with M=Na, K or H would also be located in this region of weak interaction between layers, the interlayer region.

Depending on the value $x=SiO_2/M_2O$ there are different structures and different spacings, which in the sodium series of synthetic crystalline layered silicates would be:

Kanemite, with $SiO_2/Na_2O=2$ and basal spacing 0.9 nm
Makatite, with $SiO_2/Na_2O=4$ and basal spacing 1.02 nm
Octosilicate or Ilerite, with $SiO_2/Na_2O=8$ and basal spacing 1.1 nm
Magadiite, with $SiO_2/Na_2O=14$ and basal spacing 1.56 nm
Kenyamite, with $SiO_2/Na_2O=22$ and basal spacing 1.98 nm.

Therefore one preferred embodiment of the invention is that said crystalline layered silicate is kanemite, makatite, ilerite, magadiite and/or kenyamite.

By following a simple model, this series would correspond, respectively, to two-dimensional structures with one, two, three, four and five tetrahedrons ($SiO_4$) layers in each layer.

The interlayer spacings can be modified in several manners including the ionic exchange of the metal cations by organic cationic compound, polar molecule absorption by ion-dipole interaction and/or hydrogen bridges, acid-base reaction or by reacting the Si—OH groups with reactive molecules generating covalent bonds.

In the scope of the present invention, "swelled" silicate is understood as any crystalline layered silicate housing, in their interlayer space, molecules different from the alkaline ions used in their synthesis, which normally involves a modification of the interaction force and of the distance between the layers thereof.

The substitution and swelling will favor the subsequent layering of the silicate during the process of mixing with the precipitated silica and the rubbers, and it is considered that these layered species are the ones responsible for improving and optimizing the properties of the rubber mixture.

Another embodiment of the invention comprises additional precipitated silica, for example of EBROSIL PD and EBROSIL S-125 PD (IQESIL) type. But a more preferred embodiment is that said additional silica is high dispersion silica.

The filler of the invention can further comprise other additional components, for example carbon black, amorphous sodium aluminosilicate, amorphous silica-alumina, aluminium oxides, aluminium oxohydroxides, magnesium oxides or natural layered silicates, preferably montmorillonite, smectite and/or kaolinite.

Generally, the silica used in the present invention has a BET surface according to the ISO 787-9 Standard, between 150 $m^2/g$ and 180 $m^2/g$, a BET surface CTAB surface ratio below 1.1 (J. Janzen and G. Kraus in Rubber Chem. Technol., 1971, Vol. 44 (5), 1287-1296, "Specific Surface Area Measurements on Carbon Black"), an apparent density compacted according to UNE Standard 53137 above 270 g/L and an elemental particle size measured by TEM between 15 nm and 22 nm. But the effect of lower fuel consumption achieved in the vehicles due to the reduction of the energy loss during rolling is particularly enhanced when the silica used has the characteristics of the invention, values obtained from the analysis of the mercury porosimetry curves according to the methods described in D. Julve et al., in Journal of Non-Crystalline Solids, Vol. 357 (4), 1319-1327 (2011) after the correction due to the compressibility of the silica structure.

The reinforcing filler for rubber of the invention is more favorable to the tread energy dissipation parameters than the current formulas based on silica/silane systems, which assures a lower fuel consumption, maintaining the balance in the loss by abrasion and in elastic modulus allowing the use thereof in tread bands for covering passenger car tires. As will be seen in the examples, with respect to the mixture containing only silica, there is a decrease, less than 20%, and even less than 10%, in the elastic modulus at low deformation, and the loss by abrasion is virtually intact, whereas there is a considerable reduction of the loss factor (tangent δ). The properties of the low deformability and high reinforcement silica and the crystalline layered silicate swelled with a quaternary ammonium salt of the present invention allows assuring that during the process of mixing, along with the layering of the silicate the good dispersion of the silica is produced, several rupture points being generated in the three-dimensional network of the latter and obtaining the microscopic structure which allows the synergistic improvement of the tread resistance properties in the rubber formulations for tread band used with respect to the commercial silicas used in advanced "high dispersion silica/organosilane" systems.

The silica manufacturing system of the invention is based on a precipitation in four steps, a) appearance and control of elemental particles, b) growth and control of the elemental particles until their flocculation assuring a growth homogenous and close to the thermodynamic process, c) growth and control of the silica aggregates and d) acidifying the system and forming the agglomerates. The singularity of the silica appears as a result of the way of controlling the first three steps of this precipitation.

In the first step of the precipitation process, the step of the appearance and control of elemental particles will be started by adding silicate and sulfuric acid on a water bed and electrolyte at a constant and controlled temperature between 70° C. and 90° C., preferably at 80° C. The concentration of electrolyte may vary between 0 ppm and 30000 ppm, preferably 500 ppm. First, the silicate will be added until reaching a working pH between 7.7 and 9.3, preferably 8.3. The acid will be added once the working pH is reached such that it is maintained constant at that value. The speed of adding and stirring will allow generating a silica sol with a uniform elemental particle distribution. The concentration of electrolyte in this step will assure the correct flocculation in the second step.

In the second step, the step of growth and control of the elemental particles until their flocculation, a uniform growth of the elemental particles of the sol must be maintained. It will be performed at a constant temperature between 70° C. and 90° C., preferably at 80° C. The sodium silicate will be added at a constant rate, meanwhile the acid will be added such that the working pH is kept constant between 7.7 and 9.3, preferably 8.3. This step will be maintained until the size of the elemental particles of the sol reach the objective size which will be between 11 nm and 22 nm, preferably 14 nm; at which time the flocculation will be produced. The duration of this step and the concentration of silica at its end point will be conditioned by the stirring, the working temperature and the amount and initial concentration of the electrolyte. The concentration of silica at this point may vary between % $SiO_2$=2% and % $SiO_2$=4%. One of the necessary characteristics of this process is the homogeneity of the elemental particles, as a result of the fact that their growth has been controlled close to the thermodynamic process, which requires control in rates, dilutions and stirring until reaching between $2.8 \cdot 10^{18}$ particles/100 g and $4.0 \cdot 10^{17}$ particles/100 g before the flocculation, specifically $1.3 \cdot 10^{18}$ particles/100 g for the conditions indicated as preferable.

In the third step which is the step of growth and control of aggregates, an addition of silicate at constant rate will be maintained, an acid addition rate which, once the working pH is reached, will be placed between 7.7 and 9.3, preferably at 8.3, will be that necessary to keep that pH constant; as well as a constant temperature between 70° C. and 90° C., preferably at 80° C. The end point of this step will be indicated by the value of objective BET area which will be placed between 150 m²/g and 180 m²/g, preferably 175 m²/g. This means that the percentage of silica in this third step will be increased by a value which will vary between %Δ$SiO_2$=0.3 and %Δ$SiO_2$=2.5, specifically %Δ$SiO_2$=1.3 for the conditions indicated as preferable.

In the fourth step, the step of acidifying the system, maintaining a constant temperature between 70° C. and 90° C., preferably at 80° C., and without adding sodium silicate which has been ended in the previous step, the addition of sulfuric acid will be maintained until reaching a pH between 4 and 5, preferably 4.3. Once this pH called the final pH is reached and before filtering, a maturation period up to 2 hours can be maintained at the working temperature or the system can be left to cool freely, preferably 10 minutes.

After obtaining the silica suspension according to the above precipitation process, the steps of filtration, washing and drying will be performed by the common methods of the sector. Preferably the silica is separated in filter presses, a washing process being performed to remove the sodium sulfate appearing as by-product. After that, the suspension is converted into solid cakes with a silica concentration between 20% and 30%. Some of the common techniques, preferably the nozzle atomization technique will be used for drying from a suspension the silica content of which will be greater than 14%, preferably greater than 16%.

The reinforcing filler of the invention enhances the mechanical properties of the rubber composite, achieves less energy dissipation than other compositions based on conventional filler systems and allows an improved processability.

A very preferred embodiment is the vulcanized rubber comprising the reinforcing filler of the invention. Another embodiment is said vulcanized rubber comprising at least one base diene rubber selected from the group consisting of natural rubber, synthetic polyisoprene, polybutadiene, styrene and butadiene copolymer, and isoprene and butadiene rubber, or the mixtures thereof.

Another preferred embodiment is a tire tread band comprising the rubber according to the invention; and another yet more preferable embodiment, a tire comprising the rubber according to the invention.

The rubber formulation obtained by means of this reinforcing filler composition presents a great reduction of the energy dispersed in the tread without compromising the general properties of use due to losses in resistance to abrasion and elastic moduli which are less than 20%, and normally less than 10%. The improvement in the properties of the rubber mixture is produced in a magnitude that cannot be reached in an individual manner not by the precipitated silica or by the layered silicate. Therefore, the effect produced must be attributed to a combined effect, to a modification in the properties which in the majority three-dimensional precipitated silica filler system generate the minority two-dimensional particles having the layered silicate. A synergistic effect is produced between both components of the filler system. The effect achieved for very low concentration of silicate swelled or layered, and the possibility of modulating properties of the rubber formulation depending on the percentage of said silicate must be highlighted.

The rubbers reinforced with the filler of the invention show synergistic improvements in the dissipation of energy in tread, maintaining the properties of the abrasion and the dynamic modules at low deformation.

For the rubbers for tire tread band the total sum of the reinforcing fillers is greater than 50 phr, preferably between 70 and 90 phr, to achieve a suitable balance between mechanical, dynamic and rheological properties.

The mixture of vulcanized rubber, will be understood as at least one base diene rubber selected from the group consisting of natural rubber (NR), synthetic polyisoprene (IR), polybutadiene (BR), styrene and butadiene copolymer (SBR) and isoprene and butadiene rubber (IIR), or the mixtures thereof.

EXAMPLES

In order to show the present invention by way of non-limiting illustration, the following examples are provided.

Example 1

Synthesizing High Dispersion Silica 600 kg of water and 300 g of $Na_2SO_4$ were added in a 1.5 m³ tank and under a constant stirring of 600 rpm, being heated until reaching 80° C. Once that temperature was reached, a solution of sodium silicate having ratio Rw=3.14 and 19.13% in dry matter at constant speed of 18.2 kg $SiO_2$/h was added, maintaining the temperature and the stirring. At the instant in which the pH of the reaction medium reached a pH=8 diluted sulfuric acid with a mean rate of 8.16 kg $H_2SO_4$/h was added. To achieve the suitable growth of the elemental silica particles water was simultaneously added with a total rate of 291.6 kg/h, and the temperature and pH were kept constant. These conditions were preserved until reaching a total sulfuric acid mass of 18.72 kg, at which time the addition of sodium silicate was stopped. To end the precipitation process the addition of diluted sulfuric acid was maintained. When the total sulfuric acid mass had reached 19.5 kg the addition of the diluted sulfuric acid was stopped. The suspension of silica and sodium sulfate thus obtained, after a two-hour maturation, was passed through a press filter where it was filtrated, washed to remove the sulfate and a subsequent draining from the cakes until reaching a 25% content in dry matter. The solid cake, after resuspension in water at 16% in dry matter, was atomized in drying equipment by atomization from the company Niro.

In the scope of the present invention the inventors call the silica obtained "SAD8711", having the properties shown in Table I.

TABLE I

| Property | Silica SAD8711 |
|---|---|
| $A_{BET}$ (m²/g) | 162 |
| $A_{CTAB}$ (m²/g) | 158 |
| Mercury intrusion | |
| $V_p$ (cm³/g) | 1.4 |
| $V_2/V_1$ | 0.62 |
| $k_p$ (MPa$^{-1}$) | $1.6 \cdot 10^{-2}$ |
| $D_p$ intrusion starts (nm) | 30.0 |
| $D_p$ @ dV/dDp max (nm) | 24.2 |
| Width @ ½ height (nm) | 11.9 |
| $D_p$* @ dV/dDp max (nm) | 29.5 |
| Width* @ ½ height (nm) | 14.4 |
| Mercury extrusion | |
| $k_p$' (MPa$^{-1}$) | $1.1 \cdot 10^{-2}$ |
| $D_p$ extrusion ends (nm) | 72.1 |
| $D_p$' @ dV/dDp max (nm) | 55.0 |
| Width' @ ½ height (nm) | 18.6 |

Table I and the following Tables VI and VII specify the value of specific surface area measured using two different techniques, the nitrogen molecule absorption at low temperature applying the B.E.T. method ($A_{BET}$) according to the ISO 787-9 Standard, and the CTA$^+$ (hexadecyltrimethylammonium) cation absorption in solution ($A_{CTAB}$), according to J. Janzen and G. Kraus in Rubber Chem. Technol. Vol. 44 (5), 1287-1296 (1971), "Specific Surface Area Measurements on Carbon Black". The rest of the values are obtained from the treatment of the mercury intrusion/extrusion curves, for which an angle of contact between the mercury and the porous solid of 140° and a mercury surface tension of 0.480 N/m has been considered and the compression undergone by the porous structure during the mercury porosimetry analysis has been taken into account. The specific pore volume ($V_p$) and the compressibility (or compression factor) of the pores in the intrusion process ($k_p$) and extrusion process ($k'_p$) have been calculated according to the description from the article of D. Julve et al., in Journal of Non-Crystalline Solids, Vol. 357 (4), 1319-1327 (2011). The starting pore diameter of the intrusion process ($D_p$ intrusion starts) and end pore diameter of the extrusion process ($D_p$ extrusion ends) have been obtained by applying the Washburn equation to the transition pressure between regions II and III and between regions III' and II', respectively, according to the description from the article of D. Julve et al., in Journal of Non-Crystalline Solids, Vol. 357 (4), 1319-1327 (2011). From the depiction of that derived from the volume intruded with respect to the pore size (dV/dD$_p$) of the region Ill in comparison with pore size according to the description from the article of D. Julve et al., in Journal of Non-Crystalline Solids, Vol. 357 (4), 1319-1327 (2011), the values $D_p$ @ dV/dD$_p$ max (pore diameter at which the highest value of said derivative is produced) and Width @ ½ height (the width of the peak of said depiction at the middle of its height) have been obtained. Similarly, but by considering region III' of the extrusion curve, the values of $D'_p$ @ dV/dD$_p$ max and Width' @ ½ height have been obtained. Finally, $D*_p$ @ dV/dD$_p$ max and Width*@ ½ height have been obtained from correcting the respective intrusion values by taking into account the prior compression which the porous silica structure undergoes during the intrusion process, according to the description mentioned in the doctoral dissertation of D. Julve, Universidad de Zaragoza (2009). The value V2/V1 has been obtained as is described in Rhodia's patent EP0520862B1 pages 5 to 8.

Example 2

Swelling the Crystalline Alkaline Octosilicate $Na_2O.8SiO_2.9H_2O$ And Commercial Montmorillonite with Hexadecyltrimethylammonium Bromide (CTAB)

To carry out the ionic exchange of the sodium cations present in the interlayer space with larger hexadecyltrimethylammonium cations (CTA$^+$, cetyltrimethylammonium) which cause the swelling, the layered silicate, a crystalline sodium octosilicate of formula $Na_2O.8SiO_2.9H_2O$ was added on a 0.02 M solution of CTAB such that the CTAB/Na ratio was 1. The process was repeated with the commercial montmorillonite Nanofill 116 (Southern-clay Products Inc. or Rockwood Additives Ltd.) such that the CTAB/Na ratio thereof was 1.7. The mixtures were kept under stirring for 24 hours at 60° C. The resulting products were then filtered and washed with hot water at 80° C., after which they were left to dry by air for 2 days.

The X-ray diffraction study showed how the peak corresponding to the basal spacing of 1 nm of the octosilicate and of 1.2 nm of the montmorillonite had been shifted to lower 2θ values as the distance between the layers increases: 2.7 nm in the octosilicate and 2.5 nm in the montmorillonite.

Incorporating the hexadecyltrimethylammonium ions in the interlayer space of both layered silicates was also confirmed by means of infrared spectroscopy, being observed that after the exchange two new bands between 2700-3000 cm$^{-1}$ corresponding to the asymmetric vibration of stretching the $CH_3$ group and another at 1474 cm$^{-1}$ assigned to the symmetric deformation of the $CH_2$ group appear.

Example 3

Preparing Rubber Mixture with 80 phr of Silica SAD 8711

The process of mixing was started in an internal mixer (Brabender) at 50° C. with its Banbury type rotor rotating at 75 rpm in the amounts reflected in Table II. This equipment achieves an efficient mixing of the components when the piston is closed and allows adding ingredients to the mixture through its feeder when the piston is open. First, the elastomers (S-SBR, BR), the stearic acid and the zinc oxide were introduced. One minute after the first addition the piston of the equipment was opened and the silane coupling agent and half of the filler system (40 phr of silica SAD 8711) was added. After another minute, the rest of the filler system (40 phr of silica SAD 8711) and the 6 PPD as antioxidant and antiozonant were added. The processing of these components progressively increases the temperature of the mixture. Once the addition of all the components ended, and when said temperature reached 145° C., a 4-minute period of mixing was started in which the temperature was kept in the 140° C./150° C. range with the aid of several openings of the piston and by reducing the speed of the rotors to 60 rpm. After that period the rotation of the rotors was stopped, the mixture was unloaded from the internal mixer and was laminated in a roller mixer.

TABLE II

| Ingredients | Example 3 | Example 5 | Example 6 | Example 7 | Example 8 | Example 9 |
|---|---|---|---|---|---|---|
| S-SBR Buna 5025-1 H[a] | 96 | 96 | 96 | 96 | 96 | 96 |
| BR high cis NEO 40 | 30 | 30 | 30 | 30 | 30 | 30 |
| Stearic acid | 2 | 2 | 2 | 2 | 2 | 2 |
| Zinc oxide | 3 | 3 | 3 | 3 | 3 | 3 |
| Silica | 80 | 80 | 80 | 80 | 80 | 80 |
| Octosilicate swelled with CTAB[b] | — | — | — | 3.2 | 6 | — |
| Montmorillonite swelled with CTAB[b] | — | — | — | — | — | 6 |
| Silane[c] (50% supported on carbon black) | 11.5 | 11.5 | 11.5 | 11.5 | 11.5 | 11.5 |
| 6 PPD[d] | 1.5 | 1.5 | 1.5 | 1.5 | 1.5 | 1.5 |
| Total parts | 224.0 | 224.0 | 224.0 | 227.2 | 230.0 | 230.0 |

[a]Rubber poly(styrene-butadiene) obtained in solution extended with 37.5 parts of aromatic oil (70 parts of rubber, 26 parts of oil)
[b]Hexadecyltrimethylammonium bromide
[c]bis-(triethoxysilylpropyl)tetrasulfide (TESPT) 50% supported on carbon black
[d]N-1,3-dimethyl-butyl N-phenylparaphenylenediamine
The weights of this table refer to 100 parts by weight of the total rubber (phr).

After 24 hours, in a second step of mixing the corresponding amounts of the vulcanization system according to the Table III were incorporated on part of the compound obtained in the first step (170.4 phr): N-cyclohexyl-2-benzothiazole-sulfenamide (CBS) and diphenylguanidine (DPG) as accelerants and sulfur as vulcanizing agent. To that end, the compound obtained in the first step was introduced in the internal mixer, again at 50° C. and 75 rpm and the piston was closed. The temperature of the mixture is again increased with the processing time. When said temperature reached 90° C., the components of the vulcanization system were introduced. After a minute of mixing, the compound was unloaded from the internal mixer and was layered in a roller mixer.

TABLE III

| Ingredients | Example 3 | Example 5 | Example 6 | Example 7 | Example 8 | Example 9 |
|---|---|---|---|---|---|---|
| Batch from the first mixture | 170.4 | 170.4 | 170.4 | 170.4 | 170.4 | 170.4 |
| CBS[e] | 1.5 | 1.5 | 1.5 | 1.5 | 1.5 | 1.5 |
| DPG[f] | 2 | 2 | 2 | 2 | 2 | 2 |
| Sulfur | 1.4 | 1.4 | 1.4 | 1.4 | 1.4 | 1.4 |
| Total parts | 175.3 | 175.3 | 175.3 | 175.3 | 175.3 | 175.3 |

[e]N-cyclohexyl-2-benzothiazolesulfenamide
[f]diphenylguanidine
The weights of this table referred to 100 parts by weight of the total rubber (phr).

At 24 hours after ending the second step of mixing, the latter was vulcanized in a hydraulic press of the brand Gibitre Instruments Srl at 165° C. to obtain the specimens necessary for characterizing the compound obtained by means of the tensile, abrasion and hardness tests. The optimum vulcanization time was determined by means of a rheometric curve made at the same temperature in RPA2000 equipment from the company Alpha Technology.

Example 4

Characterizing Rubber Mixture with 80 phr of Silica SAD 8711

For characterizing the properties of the rubber composite test methods typical in the rubber industry have been used:

The tensile properties (resistance, elongation at break and the tension values at extensions of 100 and 300%) have been determined according to the UNE Standard 53510: 2001.

The hardness of the vulcanized mixtures has been determined by following the UNE Standard 53130.

The abrasion test has been conducted according to the UNE Standard 53527.

The dynamic properties have been obtained using a rubber processability analyzer (RPA2000) of Alpha Technology, on specimens previously vulcanized at 165° C. in the same equipment, and for the optimum vulcanization time; according to a variant of the ASTM Standard D6601-02.

The properties of the rubber mixture incorporating the silica SAD 8711 are shown in Tables IV and V. These properties reflect the common properties of a rubber mixture intended for the passenger car tread band. The loss by abrasion correlates with the duration in use of the tire. The loss factor tan δ at 60° C. correlates with the resistance at the tread of a tire, wherein a lower value means a lower resistance at the tread, and therefore a lower fuel consumption.

TABLE IV

| | Example 4 | Example 5 | Example 6 | Example 7 | Example 8 | Example 9 |
|---|---|---|---|---|---|---|
| Module 100% (MPa) | 2.5 | 3.0 | 3.1 | 2.6 | 2.8 | 2.9 |
| Module 300% (MPa) | 12.0 | 13.7 | 14.0 | 12.5 | 14.7 | 13.4 |
| Resistance to break (MPa) | 21 | 19 | 21 | 19 | 19 | 21 |
| Elongation at break (%) | 446 | 384 | 414 | 420 | 365 | 425 |
| Hardness (°Shore A) | 65 | 68 | 70 | 64 | 64 | 66 |
| Loss by abrasion (mm$^3$) | 62 | 62 | 62 | 64 | 68 | 66 |

TABLE V

| | Example 4 | Example 5 | Example 6 | Example 7 | Example 8 | Example 9 |
|---|---|---|---|---|---|---|
| G' 60° C. (MPa) 1 Hz 0.98% | 2.5 | 2.6 | 2.7 | 2.3 | 2.0 | 2.5 |
| G' 60° C. (MPa) 1 Hz 10% | 1.4 | 1.5 | 1.6 | 1.3 | 1.3 | 1.4 |
| tan δ 60° C. 1 Hz 10% | 0.215 | 0.220 | 0.225 | 0.185 | 0.170 | 0.210 |

Example 5

Preparing and Characterizing Rubber Mixture with 80 phr of Silica Ultrasil 7000 GR The method of Example 3 was repeated using silica Ultrasil 7000 GR (Evonik Degussa GmbH) to prepare a rubber mixture for tire tread band. The characterizing properties of the silica used appear in Table VI.

TABLE VI

| Property | Silica Ultrasil 7000 GR |
|---|---|
| $A_{BET}$ (m²/g) | 175 |
| $A_{CTAB}$ (m²/g) | 169 |
| Mercury intrusion | |
| $V_p$ (cm³/g) | 1.7 |
| $V_2/V_1$ | 0.29 |
| $k_p$ (MPa⁻¹) | $2.3 \cdot 10^{-2}$ |
| $D_p$ intrusion starts (nm) | 40.0 |
| $D_p$ @ dV/dDp max (nm) | 29.0 |
| Width @ ½ height (nm) | 15.0 |
| $D_p$* @ dV/dDp max (nm) | 35.6 |
| Width* @ ½ height (nm) | 18.4 |
| Mercury extrusion | |
| $k_p'$ (MPa⁻¹) | $1.1 \cdot 10^{-2}$ |
| $D_p$ extrusion ends (nm) | 103.6 |
| $D_p'$ @ dV/dDp max (nm) | 62.2 |
| Width' @ ½ height (nm) | 28.7 |

The rubber mixture was prepared following the two-step method of mixing in an internal mixer, with subsequent vulcanization at 165° C., as is described in Example 3. The amounts of components used are shown in Tables II and III. These amounts coincide with those of Example 3 except in the silica used, since in this case the silica of the invention SAD 8711 was replaced by the commercial silica Ultrasil 7000 GR. The properties of the rubber mixture obtained, incorporating the silica Ultrasil 7000 GR are shown in Tables IV and V. These properties reflect, the common properties of a rubber mixture intended for the passenger car tread band. The values are very similar to those presented by the rubber mixture in Example 4.

Example 6

Preparing and Characterizing Rubber Mixture with 80 phr of Silica Zeosil 1165

The method of Example 3 was repeated using silica Zeosil 1165 (Rhodia) to prepare a rubber mixture for tire tread band. The characterizing properties of the silica used appear in Table VII.

TABLE VII

| Property | Silica Zeosil 1165 |
|---|---|
| $A_{BET}$ (m²/g) | 165 |
| $A_{CTAB}$ (m²/g) | 160 |
| Mercury intrusion | |
| $V_p$ (cm³/g) | 1.7 |
| $V_2/V_1$ | 0.42 |
| $k_p$ (MPa⁻¹) | $2.3 \cdot 10^{-2}$ |
| $D_p$ intrusion starts (nm) | 34.2 |
| $D_p$ @ dV/dDp max (nm) | 28.2 |
| Width @ ½ height (nm) | 15.2 |
| $D_p$* @ dV/dDp max (nm) | 35.3 |
| Width* @ ½ height (nm) | 19.1 |
| Mercury extrusion | |
| $k_p'$ (MPa⁻¹) | $1.2 \cdot 10^{-2}$ |
| $D_p$ extrusion ends (nm) | 94.8 |
| $D_p'$ @ dV/dDp max (nm) | 64.1 |
| Width' @ ½ height (nm) | 24.6 |

The rubber mixture was prepared following the two-step method of mixing on an internal mixer, with subsequent vulcanization at 165° C.; as is described in Example 3. The amounts of components used are shown in Tables II and III. These amounts coinciding with those of Example 3 except in the silica used, since in this case the silica of the invention SAD 8711 was replaced by the commercial silica Zeosil 1165. The properties of the rubber mixture obtained, incorporating the silica Zeosil 1165, are shown in the Tables IV and V. These properties reflect the common properties of a rubber mixture intended for passenger car tread band. The values reflect properties similar to those presented by the rubber mixture in Example 4, with a slightly greater value of the loss factor.

Example 7

Preparing and Characterizing Rubber Mixture with 80 phr of Silica SAD 8711 and 3.2 phr of Octosilicate Swelled with CTAB Following a method of mixing similar to Example 3a rubber mixture for tire tread band incorporating a filler system proposed in the invention made up of silica and swelled layered silicate was prepared. With respect to Example 3 a new component, a swelled crystalline layered silicate, specifically the sodium octosilicate swelled with CTAB obtained in Example 2 was added in an amount of 3.2 phr.

The process of mixing was started in an internal mixer (Brabender) at 50° C. with its Banbury type rotors rotating at 75 rpm in the amounts reflected in Tables II and III. Thus, the elastomers (S-SBR, BR), the stearic acid and the zinc oxide were first introduced. One minute after ending the first addition the piston of the equipment was opened and the silane as coupling agent and half of the filler system (40 phr of silica SAD 8711 and 1.6 phr of sodium octosilicate swelled with CTAB) was added. After another minute, the rest of the filler system (40 phr of silica SAD 8711 and 1.6 phr of sodium octosilicate swelled with CTAB) and the 6 PPD as antioxidant and antiozonant agent was added. The rest of the process of mixing is similar to that of Example 3, with its two steps of mixing and subsequent vulcanization at 165° C.

The properties of this rubber mixture, incorporating the silica SAD 8711 of Example 1 and 3.2 phr of the sodium octosilicate swelled with CTAB of Example 2, are shown in Tables IV and V. The values obtained reflect optimum properties for the use thereof as tread band in tire covers. The value of the loss factor or tangent δ at 60° C. stands out, improving those appeared in Examples 4, 5 and 6 above. It is demonstrated that the application thereof in the tire tread bands would allow a lower resistance at the tread, and therefore a lower fuel consumption as is indicated in the claims of this patent.

With respect to Examples 4, 5 or 6 where the swelled crystalline layered silicate has not been incorporated, the dynamic module at low deformation (G' 60° C. (MPa) 1 Hz 0.98%) and the abrasion have undergone declines less than 10%; assuring that along with the lower energy consumption this mixture maintained the rest of the properties demanded for the use as a tread band for passenger car tire covers.

These properties reflect a balance in the properties of the rubber mixture which is produced in a magnitude which cannot be reached individually not by the precipitated silica or by the swelled layered silicate. Therefore it is considered that the effect produced must be attributed to a combined effect, to a modification in the properties which in the majority three-dimensional precipitated silica filler system generate the minority two-dimensional particles having the layered silicate. A synergistic effect is produced between the components of the filler system described by the invention. An improvement as significant as that achieved by the materials indicated in the patent is not produced with the other silicas or with other layered silicates.

Example 8

Preparing and Characterizing Rubber Mixture with 80 phr of Silica SAD 8711 and 6 phr of Octosilicate Swelled with CTAB The method of Example 7 was repeated, increasing the amount of octosilicate swelled with CTAB from 3.2 phr to 6 phr. A rubber mixture for tire tread band incorporating a filler system proposed in the invention, made up of silica (SAD 8711, 80 phr) and modified layered silicate (octosilicate swelled with CTAB of the Example 2, 6 phr) was prepared.

The rubber mixture was prepared following the two-step method of mixing in an internal mixer, with subsequent vulcanization at 165° C.; as is described in Example 7. The amounts of components used are shown in Tables II and III, coinciding with those of Example 7, except in the amount of swelled layered silicate which replaces 3.2 phr with 6 phr.

The properties of the rubber mixture obtained are shown in Tables IV and V. The value of the loss factor or tangent δ at 60° C. again stands out, improving those appeared in Examples 4, 5, 6 and 7 above. However the balance of the properties for an optimum application in tread band has been lost, the dynamic modules (G' 60° C. (MPa) 1 Hz 0.98%) and the abrasion have undergone declines greater than or close to 20%. Although this mixture allows a lower energy consumption, its incorporation in tread band for passenger car tire covers present values at the limit for use, requiring improvements.

Example 9

Preparing and Characterizing Rubber Mixture with 80 phr of Silica SAD 8711 and 3.2 phr of Commercial Montmorillonite Swelled with CTAB A rubber mixture for tire tread band incorporating a filler system made up of silica (SAD 8711, 80 phr) and a layered silicate considered as a market standard (Nanofil 116 from the company, Rockwood Additives Ltd., in an amount of 3:2 phr) swelled with CTAB was prepared. Nanofil 116 is a commercial sodium montmorillonite. For this experiment the sodium ions thereof have been substituted, according to the method described in Example 2, by larger hexadecyltrimethylammonium cations which cause their swelling.

The rubber mixture was prepared following the two-step method of mixing in an internal mixer, with subsequent vulcanization at 165° C.; as is described in Example 7. The components and amounts of components used are shown in Tables II and III, coinciding with those of Example 7 except in the composition of the swelled layered silicate which replaces layered octosilicate swelled with CTAB with commercial montmorillonite swelled with CTAB.

The properties of the rubber mixture obtained are shown in Tables IV and V. In this Example 9 the properties are virtually similar to those shown in Example 3. In other words, the montmorillonite swelled and incorporated in 3.2 phr has generated an effect virtually negligible on the mostly silica network. The effect which the crystalline alkaline silicates proposed in this invention, like the one shown by the sodium octosilicate swelled with CTAB and incorporated in 3.2 phr and 6 phr in Examples 7 and 8, respectively, on the value of the loss factor or tangent δ at 60° C., cannot be reached by all the layered silicates; it is therefore a particular effect in combination with certain silicas for some of them.

Although the numerical values are not shown, other filler systems where along with the silica there has been added both a) non-swelled octosilicate, and b) a mixture of non-swelled octosilicate along with CTAB have also been proven, and in no case the advantages indicated by the invention have been obtained.

Example 10

Preparing and Characterizing Rubber Mixture with 90 phr of Silica SAD 8711

A rubber mixture for tire tread band incorporating a filler system with silica (SAD 8711) with 90 phr was prepared. The mixture was prepared following the two-step method of mixing in an internal mixer, with subsequent vulcanization at 165° C.; as is described in the method of Example 3. The amounts of components used are shown in Tables VIII and IX, coinciding with those of Example 3 except in the amount of silica which replaces 80 phr with 90 phr, and of silane which replaces 11.5 phr with 12.9 phr.

The properties of the rubber mixture obtained which incorporated the silica SAD 8711 in 90 phr are shown in Tables X and XI. These properties reflect that the common properties of a rubber mixture intended for the passenger car tread band, see Example 4, have been modified. The properties related with fuel consumption (tangent δ at 60° C.) and duration (abrasion) have declined. Contrarily, the values of dynamic modules at low deformation (G' 60° C. (MPa) 1 Hz 0.98%) improved.

Example 11

Preparing and Characterizing Rubber Mixture with 90 phr of Silica SAD 8711 and 2 phr of Octosilicate Swelled with CTAB A rubber mixture incorporating a filler system proposed in the invention made up of silica (SAD 8711, 90 phr) and modified layered silicate (octosilicate swelled with CTAB of Example 2, 2 phr) was prepared.

The rubber mixture was prepared following the two-step method of mixing in an internal mixer, with subsequent vulcanization at 165° C.; as is described in the method of Example 3. The amounts of components used are shown in Tables VIII and IX, coinciding with those of Example 3 except in the amount of silica, which replaces 80 phr with 90 phr, and of silane which replaces 11.5 phr with 12.9 phr; further incorporating a new component, the sodium octosilicate swelled with CTAB in Example 2, in an amount of 2 phr.

The properties of this rubber mixture incorporating 90 phr of silica SAD 8711 and 2 phr of sodium octosilicate swelled with CTAB, are shown in Tables X and XI.

With respect to the rubber obtained in Example 10 an improvement in the value of the loss factor or tangent δ at 60° C. has been produced, allowing a lower resistance at the tread to be reached, and therefore a reduction in the fuel consumption, similar to that achieved in Examples 4, 5 or 6.

Example 12

Preparing and Characterizing Rubber Mixture with 90 phr of Silica SAD 8711 and 6 phr of Octosilicate Swelled with CTAB The method of Example 11 was repeated, increasing the amount of octosilicate swelled with CTAB from 2 phr to 6 phr. A rubber mixture for tire tread band incorporating a filler system proposed in the invention made up of silica (SAD 8711, 90 phr) and modified layered silicate (octosilicate swelled with CTAB, 6 phr) was prepared.

The rubber mixture was prepared following the two-step method of mixing in an internal mixer, with subsequent vulcanization at 165° C.; as is described in the method of Example 3. The amounts of components used are shown in Tables VIII and IX, coinciding with those of Example 3 except in the amount of silica which replaces 80 phr with 90 phr, of silane which replaces 11.5 phr with 12.9 phr and of sodium octosilicate swelled with CTAB which is incorporated in an amount of 6 phr.

The properties of this rubber mixture incorporating 90 phr of silica SAD 8711 and 6 phr of sodium octosilicate swelled with CTAB are shown in Tables X and XI.

The value of the loss factor or tangent S at 60° C. improved with respect to those appeared in Examples 4, 5 and 6, and equal to that of Example 7 again stands out. In this example an optimum balance of properties for the application in tread band has been achieved. With respect to the formula proposed in Example 7 the improvement in the dynamic modulus (G' 60° C. (MPa) 1 Hz 0.98%) stands out.

Example 8 had indicated that although this mixture would allow a lower energy consumption, for the rest of the properties for the use as tread band for passenger car tire covers better ones should be found. These improvements have been achieved by the mixture of the present Example 12.

TABLE X

| | Example 10 | Example 11 | Example 12 | Example 13 | Example 14 |
|---|---|---|---|---|---|
| Module 100% (MPa) | 3.0 | 3.1 | 3.1 | 2.8 | 2.9 |
| Module 300% (MPa) | 12.1 | 13.6 | 14.9 | 14.8 | 12.5 |
| Resistance to break (MPa) | 20 | 19 | 19 | 19 | 22 |
| Elongation at break (%) | 406 | 380 | 360 | 363 | 442 |
| Hardness (Shore A) | 70 | 68 | 68 | 68 | 69 |
| Loss by abrasion (mm$^3$) | 64 | 66 | 69 | 73 | 75 |

TABLE XI

| | Example 10 | Example 11 | Example 12 | Example 13 | Example 14 |
|---|---|---|---|---|---|
| G' 60° C. (MPa) 1 Hz 0.98% | 2.9 | 2.9 | 2.5 | 2.2 | 2.9 |
| G' 60° C. (MPa) 1 Hz 10% | 1.5 | 1.5 | 1.5 | 1.4 | 1.5 |
| tan δ 60° C. 1 Hz 10% | 0.237 | 0.229 | 0.185 | 0.163 | 0.223 |

TABLE VIII

| Ingredients | Example 10 | Example 11 | Example 12 | Example 13 | Example 14 |
|---|---|---|---|---|---|
| S-SBR Buna 5025-1 H$^a$ | 96.0 | 96.0 | 96.0 | 96.0 | 96.0 |
| BR high cis NEO 40 | 30.0 | 30.0 | 30.0 | 30.0 | 30.0 |
| Stearic acid | 2.0 | 2.0 | 2.0 | 2.0 | 2.0 |
| Zinc oxide | 3.0 | 3.0 | 3.0 | 3.0 | 3.0 |
| Silica | 90.0 | 90.0 | 90.0 | 90.0 | 90.0 |
| Octosilicate swelled with CTAB$^b$ | — | 2.0 | 6.0 | 10.0 | — |
| Montmorillonite swelled with CTAB$^b$ | — | — | — | — | 6.0 |
| Silane$^c$ (50% supported on carbon black) | 12.9 | 12.9 | 12.9 | 12.9 | 12.9 |
| 6 PPD$^d$ | 1.5 | 1.5 | 1.5 | 1.5 | 1.5 |
| Total parts | 235.4 | 237.4 | 241.4 | 245.4 | 241.4 |

$^a$Rubber poly(styrene-butadiene) obtained in solution extended with 37.5 parts of aromatic oil (70 parts of rubber, 26 parts of oil)
$^b$Hexadecyltrimethylammonium bromide
$^c$bis-(triethoxysilylpropyl)tetrasulfide (TESPT) 50% supported on carbon black
$^d$N-1,3-dimethyl-butyl N-Phenylparaphenylenediamine
The weights of this table referred to 100 parts by weight of the total rubber (phr).

TABLE IX

| Ingredients | Example 10 | Example 11 | Example 12 | Example 13 | Example 14 |
|---|---|---|---|---|---|
| Batch from the first mixture | 170.4 | 170.4 | 170.4 | 170.4 | 170.4 |
| CBS$^e$ | 1.5 | 1.5 | 1.5 | 1.5 | 1.5 |
| DPG$^f$ | 2 | 2 | 2 | 2 | 2 |
| Sulfur | 1.4 | 1.4 | 1.4 | 1.4 | 1.4 |
| Total parts | 175.3 | 175.3 | 175.3 | 175.3 | 175.3 |

$^e$N-cyclohexyl-2-benzothiazolesulfenamide
$^f$diphenylguanidine
The weights of this table referred to 100 parts by weight of the total rubber (phr).

Example 13

Preparing and Characterizing Rubber Mixture with 90 phr of Silica SAD 8711 and 10 phr of Octosilicate Swelled with CTAB The method of Example 11 was repeated, increasing the amount of octosilicate swelled with CTAB from 2 phr to 10 phr. A rubber mixture for tire tread band incorporating a filler system proposed in the invention made up of silica (SAD 8711, 90 phr) and modified layered silicate (octosilicate swelled with CTAB, 10 phr) was prepared.

The rubber mixture was prepared following the two-step method of mixing in an internal mixer, with subsequent vulcanization at 165° C.; as is described in the method of Example 3. The amounts of components used are shown in Tables VIII and IX, coinciding with those of Example 3 except in the amount of silica, which replaces 80 phr with 90 phr, of silane which replaces 11.5 phr with 12.9 phr and of sodium octosilicate swelled with CTAB which is incorporated in 10 phr.

The properties of this rubber mixture incorporating 90 phr of silica SAD 8711 and 10 phr of sodium octosilicate swelled with CTAB, are shown in Tables X and XI.

The value of the loss factor or tangent δ at 60° C. again stands out, improving those appeared in all the examples above. However the balance of the properties for an optimum application in tread band has been lost again, the abrasion has undergone a decline close to 20%. Although this mixture allows a lower energy consumption for the use as tread band for passenger car tire covers better ones for increasing the durability thereof should be searched for.

Example 14

Preparing and Characterizing Rubber Mixture with 90 phr of Silica SAD 8711 and 6 phr of Commercial Montmorillonite Swelled with CTAB A rubber mixture for tire tread band incorporating a filler system made up of silica (SAD 8711, 90 phr) and a layered silicate considered as a market standard (Nanofil 116 from the company, Rockwood Additives Ltd., in an amount of 3.2 phr) swelled with CTAB was prepared. Nanofil 116 is a commercial sodium montmorillonite. For this experiment the sodium ions thereof have been substituted, according to the method described in Example 2, by larger hexadecyltrimethylammonium cations which cause their swelling.

The rubber mixture was prepared following the two-step method of mixing in an internal mixer, with subsequent vulcanization at 165° C. The components and amounts of components used are shown in Tables VIII and IX, coinciding with those of Example 12 except in the composition of the swelled layered silicate which replaces layered octosilicate swelled with CTAB with commercial montmorillonite swelled with CTAB.

The properties of the rubber mixture obtained are shown in Tables X and XI.

The rest of the properties for an optimum application in tread band has been lost again, the abrasion has undergone a decline close to 20%. Furthermore, the value of the loss factor or tangent δ at 60° C. has not had the improvement which the octosilicate has in Example 12. It can again be concluded that the improvements proposed in this invention cannot be generalized to all types of layered silicates.

Examples 10, 11, 12, 13 and 14 attempted to show some of the possibilities which the filler system described in the invention, as is already inferred from Examples 7 and 8 can have, the addition of octosilicate swelled with CTAB synthesized in Example 2 in the rubber mixture allows modulating the property of the composite according to the needs of the application.

The mixture and the process of mixing of Example 3 has been reproduced in Example 10 with the exception that the amount of silica/silane incorporated in the filler system has reached 90 phr/12.9 phr, in order to increase the rigidity of the mixture. The addition of swelled octosilicate has allowed a quick improvement of the value of tangent delta, modulating the improvement depending on the addition percentage. To visualize this possible modulation, several examples have been made in which the amount of octosilicate swelled with CTAB in the samples is modified. The mixtures have been called Example 11, Example 12 and Example 13 according to the mixtures they contain 2, 6 or 10 parts of this composite, respectively. The amounts added are shown in Tables VIII and IX. Finally, the swelled octosilicate of the formula of Example 12 has been replaced by swelled commercial montmorillonite in Example 11; in a manner similar to that performed between Example 9 and Example 7.

The addition of the swelled octosilicate filler considerably modifies the dynamic properties, see Tables X and XI. The desired point between maintaining the module of the composite and improving the loss of energy (which would translate into lower fuel consumption) must be found. Thus, while the samples of Examples 11 and 12 have maintained all the critical properties (module, abrasion), at the same time that the loss of energy has been considerably improved; in Example 13 those properties have been sacrificed to achieve greater reductions in the dissipation of energy, correlated with tangent delta. Finally it must be indicated that the composite of Example 14, with montmorillonite, has values very far from the optimum values of the series with octosilicate.

The invention claimed is:

1. A reinforcing filler for rubber comprising the synergistic combination of:
   precipitated silica with a pore structure defined by a maximum between 25 nm and 35 nm, a total pore volume between 1.3 cm³/g and 1.6 cm³/g, and a compression factor between $1.3 \cdot 10^{-2}$ and $2.3 \cdot 10^{-2}$ MPa$^{-1}$, and
   at least one crystalline alkaline silicate corresponding to the general formula $M_2O \cdot xSiO_2 \cdot yH_2O$ wherein
   M is H, Na or K,
   "x" is an integer between 2 and 40, and
   "y" is an integer between 1 and 20,
   said crystalline alkaline silicate, swelled and/or layered in the presence of an organic cationic compound in the form of ammonium salt according to the formula $[C_nH_{2n+1}N(CH_3)_3]^+$ for "n" equal to 12, 14, 16 or 18.

2. The reinforcing filler for rubber according to claim 1, wherein said crystalline alkaline silicate is selected from the group consisting of kanemite, makatite, ilerite, magadiite and kenyamite.

3. The reinforcing filler for rubber according to claim 1, wherein said layered silicate is present in a concentration between 0.1 and 30 phr.

4. The reinforcing filler for rubber according to claim 3, wherein said concentration is 0.1 to 6 phr.

5. The reinforcing filler for rubber according to claim 1, further comprising high dispersion silica as additional precipitated silica.

6. The reinforcing filler for rubber according to claim 1, comprising at least one component selected from the group of carbon black, amorphous sodium aluminosilicate, amorphous silica-alumina, aluminium oxides, aluminium oxyhydroxides, magnesium oxides and natural layered silicates.

7. The reinforcing filler for rubber according to claim 6, wherein said natural layered silicates are montmorillonite, smectite and/or kaolinite.

8. The reinforcing filler for rubber according to claim 1, wherein said ammonium salt is ammonium chloride or ammonium bromide.

9. A vulcanized rubber comprising a reinforcing filler according to claim 1.

10. The vulcanized rubber according to claim 9, comprising at least one base diene rubber selected from the group consisting of natural rubber, synthetic polyisoprene, polybutadiene, styrene and butadiene copolymer, and isoprene and butadiene rubber, or the mixtures thereof.

11. A tire tread band comprising rubber according to claim 9.

12. A tire comprising rubber according to claim 9.

* * * * *